(12) United States Patent
Kimura

(10) Patent No.: US 11,193,785 B2
(45) Date of Patent: Dec. 7, 2021

(54) IN-VEHICLE SYSTEM

(71) Applicant: ALPINE ELECTRONICS, INC., Tokyo (JP)

(72) Inventor: Tsuyoshi Kimura, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 195 days.

(21) Appl. No.: 16/215,966

(22) Filed: Dec. 11, 2018

(65) Prior Publication Data

US 2019/0204103 A1 Jul. 4, 2019

(30) Foreign Application Priority Data

Dec. 28, 2017 (JP) .............................. JP2017-254669

(51) Int. Cl.
*G01C 21/36* (2006.01)
*B60K 35/00* (2006.01)
*G02B 27/01* (2006.01)

(52) U.S. Cl.
CPC ............ *G01C 21/365* (2013.01); *B60K 35/00* (2013.01); *G01C 21/3632* (2013.01); *G02B 27/01* (2013.01); *G02B 27/0179* (2013.01); *B60K 2370/1529* (2019.05); *B60K 2370/166* (2019.05); *B60K 2370/177* (2019.05); *B60K 2370/334* (2019.05); *G02B 2027/0141* (2013.01); *G02B 2027/0185* (2013.01)

(58) Field of Classification Search
CPC .......................... G01C 21/365; G01C 21/3632
See application file for complete search history.

(56) References Cited

U.S. PATENT DOCUMENTS

2009/0005961 A1\* 1/2009 Grabowski ............ G02B 27/01
701/532
2012/0224062 A1\* 9/2012 Lacoste .................. G02B 27/01
348/148

(Continued)

FOREIGN PATENT DOCUMENTS

JP WO2007/142084 12/2007
JP 2015-120395 7/2015

(Continued)

OTHER PUBLICATIONS

Extended European Search Report dated Apr. 26, 2019 in corresponding European Application No. 18214678.7.

*Primary Examiner* — Jess Whittington
(74) *Attorney, Agent, or Firm* — Crowell & Moring LLP

(57) ABSTRACT

A relationship between a relative position with respect to a section where a progressing direction changes on a route and an arrangement height is set such that the arrangement height gradually increases from zero to MaxH. Then, the arrangement height gradually decreases from MaxH to zero along the route from a point on the near side of the section where the progressing direction changes (FIGS. 3B and 3G and FIGS. 4B and 4C). When traveling in the section where the progressing direction changes, a direction mark representing the progressing direction at each point on a road surface is displayed using a heads-up display so as to overlap with a position on an upper side, by an arrangement height set based on a relative position of the point with respect to the section and a set relationship, from the point.

2 Claims, 8 Drawing Sheets

(56) References Cited

U.S. PATENT DOCUMENTS

| | | | | |
|---|---|---|---|---|
| 2012/0268351 | A1* | 10/2012 | Sasaki | G02B 27/01 |
| | | | | 345/8 |
| 2015/0213643 | A1* | 7/2015 | Obinata | G09B 29/106 |
| | | | | 345/634 |
| 2016/0003636 | A1* | 1/2016 | Ng-Thow-Hing | G08G 1/167 |
| | | | | 701/26 |
| 2016/0327402 | A1* | 11/2016 | Funabiki | G01C 21/365 |
| 2017/0336222 | A1* | 11/2017 | Yamaguchi | G01C 21/365 |
| 2019/0025580 | A1* | 1/2019 | Nagano | G02B 27/0149 |
| 2019/0041232 | A1* | 2/2019 | Maruyama | G09G 5/363 |

FOREIGN PATENT DOCUMENTS

| | | |
|---|---|---|
| JP | 2017-21019 | 1/2017 |
| JP | WO2017/061035 | 4/2017 |
| JP | 2017-211370 | 11/2017 |

\* cited by examiner

IN-VEHICLE SYSTEM

RELATED APPLICATIONS

The present application claims priority to Japanese Patent Appln. No. 2017-254669, filed Dec. 28, 2017, the entire disclosure of which is hereby incorporated by reference.

BACKGROUND

1. Field of the Disclosure

The present disclosure relates to a technique for guiding a route using a heads-up display provided in an automobile.

As a technique for guiding a route using a heads-up display provided in an automobile, there is known a technique for using a heads-up display to display an arrow representing a progressing direction along a route at a point at a position overlapping with the point as viewed from a user for each point that is set at regular intervals on a road surface on the route (for example, JP 2017-211370 A).

Here, when the arrow is displayed to be viewable in the overlapping manner with each point that is set at regular intervals on the road surface on the route, there is a case where it is difficult to display the arrow representing the progressing direction in a section on a route having a small curvature radius such as a tightly curved road on a route or a small intersection where a route turns right or left or at a position immediately before the section because an overlapping range as viewed from the user on the road surface on the front route is set on the lower side of a display range of the heads-up display.

Therefore, in the above-described technique, when all the positions overlapping with the respective points set on the road surface on the route as viewed from the user are out of the display range of the heads-up display and no arrow can be displayed, a display position of the arrow with respect to each point is changed to a position, overlapping with a point, which has been shifted in such a manner that a closer point is shifted upward more greatly, as viewed from the user such that the display position of each arrow is set within the display range of the heads-up display.

SUMMARY

According to the above-described technique of shifting upward the position of the point with which the arrow is overlapped as viewed from the user, the position of the arrow viewed by the user suddenly changes at a certain timing such that an arrow with respect to the closer point moves upward more greatly.

Therefore, the continuity of the display of the arrow with respect to the same point and the continuity of the route represented by a row of arrows are lost before and after the change, and thus, it is difficult for the user to intuitively grasp any point on a road surface of which progressing direction is represented by an arrow displayed immediately after the change.

Therefore, an objective of the present disclosure is to display an arrow representing a progressing direction along a route at a point for each of points set at predetermined intervals on a road surface on the route using a heads-up display in such a form that it is possible to easily grasp the point on the road surface of which progressing direction is represented by the arrow even when there is a section with a small curvature radius in the route.

To address the above-described objective, the present disclosure provides an in-vehicle system including: a heads-up display and a processor. The heads-up display is configured to display an image using a virtual image on a front side of a front windshield of an automobile with respect to a user aboard the automobile. The processor is configured to execute instructions stored in a memory and to set a route to a destination. The processor is further configured to display a direction mark representing a progressing direction along the route at a guide point at a position overlapping with the guide point as viewed from the user for each of guide points set at predetermined distance intervals on a road surface on the route in front of the automobile using the heads-up display. Here, for a section where the progressing direction on the route changes by at least a predetermined level or more, the processor is configured to set an upward display section, which is a section from a first point as a point within the section or a point on a near side of the section to a second point as a point on a far side of the first point within the section or a point on the far side of the section, and displays the direction mark for each of the guide points included in the set upward display section at a position overlapping with a position on an upper side, by an arrangement height set for the guide point, from the guide point as viewed from the user using the heads-up display, instead of displaying the direction mark at the position overlapping with the guide point as viewed from the user. Further, the arrangement height set for the guide point is set depending on a relative position of the guide point with respect to the upward display section, and the relative position and the arrangement height have a relationship that the arrangement height gradually increases from zero to a predetermined maximum height and then gradually decreases from the maximum height to zero as the relative position changes from a start point to an end point of the upward display section.

Here, implementations of the above-described in-vehicle system may be configured such that the processor sets the maximum height so as to increase as a curvature radius decreases in accordance with the curvature radius of a section where the progressing direction changes by at least the predetermined level for which the upward display section has been set.

In some implementations of an in-vehicle system, a position in a real space where the direction mark representing the progressing direction of each of the guide points is viewed by the user does not change between timings. Therefore, there is no discontinuity in display of the direction mark representing the progressing direction of the same point.

Further, in the upward display section, a height of the position in the real space where the direction mark is viewed gradually increases from a height of the road surface and gradually decreases to the height of the road surface along the progressing direction of the route, and thus, there is continuity of the positions where the respective direction marks are viewed, and no discontinuity occurs in the route represented by a row of the direction marks between the respective timings.

Further, the display position of the direction mark in the upward display section that is set in a periphery of the section where the progressing direction changes by a predetermined level is set to the position on the upper side in the case of displaying the direction mark at the position overlapping with the guide point on the road surface. Thus, it is possible to display the direction mark to guide the progressing direction of the guide point even in a case where the position overlapping with the guide point on the road surface as viewed from the user is set on a lower side of a display area of the heads-up display at the time of traveling in the section where the progressing direction changes by the predetermined level or more on the route.

Further, some implementations of the above in-vehicle system may be configured such that the processor is configured to display a figure expressing an object having a predetermined shape, inclined by an inclination set for the guide point and arranged at the position on the upper side, by the arrangement height set for the guide point, from the guide point as observed from a viewpoint of the user, as the direction mark for each of the guide points included in the upward display section. Here, the inclination set for the guide point is set depending on a relative position of the guide point with respect to the upward display section, and the relative position and the inclination have a relationship that the inclination gradually increases from zero to a predetermined maximum inclination and then gradually decreases from the maximum inclination to zero as the relative position changes from a start point to an end point of the upward display section.

In this case, the progressing direction display unit may set the maximum inclination so as to increase as a curvature radius decreases in accordance with the curvature radius of a section where the progressing direction changes by at least the predetermined level or more for which the upward display section has been set.

With such configurations, when an object representing a direction using a shape of a top face with the inclination of zero is used as the object, it is possible to suppress the direction mark from representing an object whose angle formed by the top face with respect to the line-of-sight direction is an excessively acute so that it is possible to suppress a shape of the top face of the object from being hardly viewable as the display mark, even for an object at a relatively high position. Further, it is possible to present the change in the progressing direction by a row of display marks whose height viewable on the road surface gradually changes with a natural expression without discomfort using a row of the direction marks in which inclination of the object to be represented gradually changes.

Further, implementations of the above in-vehicle system may be configured such that the processor is configured to set a section length of the upward display section so as to increase as a curvature radius decreases in accordance with the curvature radius of a section where the progressing direction changes by at least the predetermined level or more for which the upward display section has been set.

Further, implementations of the above in-vehicle system may be configured such that the progressing direction display unit displays a figure expressing an object having a predetermined shape, arranged at the position on the upper side, by the arrangement height set for the guide point, from the guide point as observed from the viewpoint of the user, as the direction mark for each of the guide points included in the upward display section, and displays a shadow figure, which is a figure expressing a shadow on the guide point of the object, arranged at the position on the upper side, by the arrangement height set for the guide point, from the guide point as observed from the viewpoint of the user, for each of the guide points included in the upward display section using the heads-up display.

Alternatively, implementations of the above in-vehicle system may be configured such that the processor is configured to displays, using the heads-up display, a figure that has a figure part representing a direction, displayed at a position overlapping with the position on the upper side by the arrangement height set for the guide point from the guide point as viewed from the user, and a figure part connecting the figure part representing the direction and the position overlapping with the guide point as viewed from the user, as the direction mark for each of the guide points included in the upward display section.

With such configurations, it is possible to more easily grasp the point (guide point) on the route where the direction mark represents the progressing direction.

As described above, according to implementations of the present disclosure, it is possible to display the arrow representing the progressing direction along the route at the point for each of the points set at the predetermined intervals on the road surface on the route using the heads-up display in such a form that it is possible to easily grasp the point on the road surface of which progressing direction is represented by the arrow even when there is the section with the small curvature radius in the route.

DETAILED DESCRIPTION OF THE DRAWINGS

Figure 1:
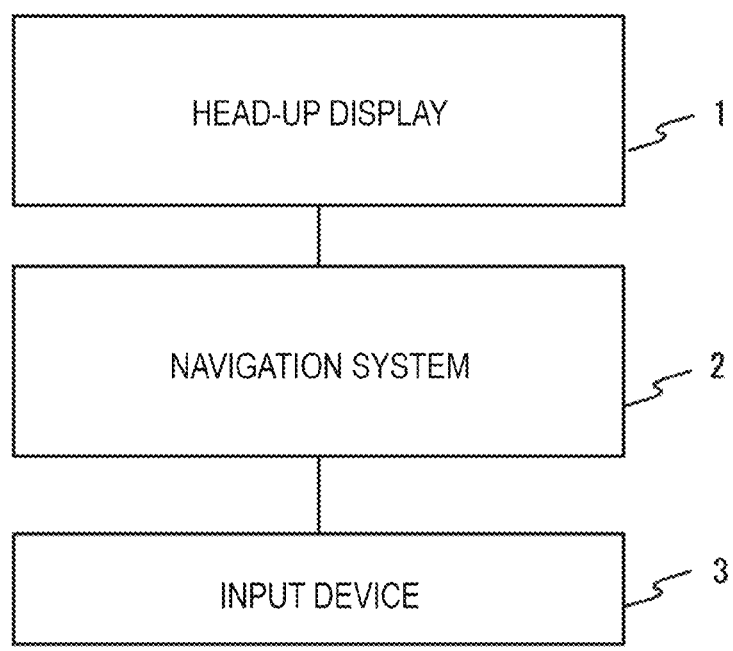
FIG. 1 is a block diagram illustrating one implementation of a configuration of an in-vehicle system.

FIG. 1 illustrates one implementation of a configuration of an in-vehicle system.

The in-vehicle system is a system to be installed in an automobile, and includes a heads-up display 1, a navigation system 2, and an input device 3 as illustrated in the drawing. Here, the navigation system 2 includes map data, a GNSS receiver that performs satellite positioning, and uses these data and receiver to perform a process of calculating a current position, a process of searching for a route to a destination set via the input device 3 and setting the route, and the like. In some implementations the heads-up display 1 and/or the navigation system 2 may include a microcontroller, central processing unit (CPU), or any other type of hardware processor that is able to read and execute instructions stored in memory.

Figure 2A:
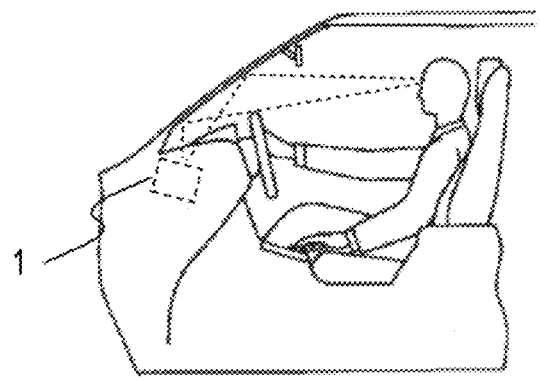
FIGS. 2A to 2C are views illustrating one implementation of an arrangement and a display area of a heads-up display.
Figure 2B:
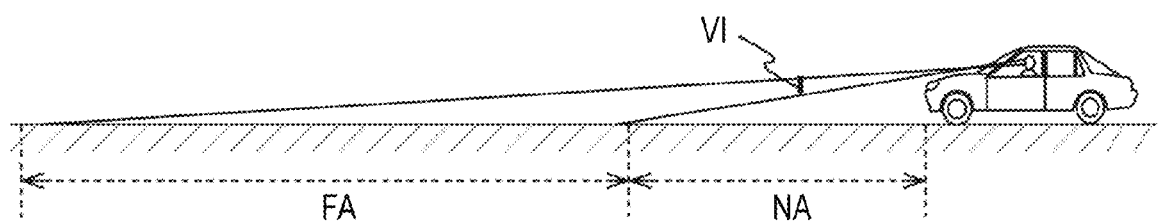

Next, the heads-up display 1 projects an image from a lower side onto a front windshield in front of a driver's seat as illustrated in FIG. 2A so that it is possible to display a virtual image VI on a front side of the front windshield as illustrated in FIG. 2B. Hereinafter, a description will be given by calling an area, illustrated in FIG. 2C, in up-down and left-right directions as viewed from a user being the driver of the automobile, where the heads-up display 1 can display the virtual image VI, as a "display area 201".

This display area 201 is fixedly set, and the heads-up display 1 can display only the virtual image VI overlapping with a point within a range FA farther from a range NA of a road surface in front of the automobile without being capable of displaying the virtual image VI so as to overlap with a point within the closer range NA of the road surface in front of the automobile as illustrated in FIG. 2B.

Hereinafter, a direction mark display operation performed in the in-vehicle system will be described.

First, a description will be given regarding a relationship between a curvature radius r of a section on the route where a progressing direction changes and an arrangement height H and an inclination θ of a direction indicating object, which are used at the time of displaying the direction mark for the section when the curvature radius r of the section on the route where the progressing direction changes is smaller than a predetermined threshold Thr in the present embodiment. Incidentally, the section on the route where the progressing direction changes is a curve section of a road through which the route passes, an intersection where the automobile turns right or left when progressing along the route, or the like.

Here, the direction indicating object is a virtual object indicating the progressing direction of each point on the route arranged on a real space, and the navigation system displays a figure representing a state of the direction indicating object viewed from the user's viewpoint, as the direction mark, at a position overlapping with the direction indication object as viewed from the user using the heads-up display 1.

In some implementations, a triangular object is used as the direction indicating object.

Further, the arrangement height H of the direction indicating object is a height of the direction indicating object from the road surface, and the inclination θ of the direction indicating object is an inclination angle of the direction indicating object with respect to the horizontal plane. However, the inclination θ of the direction indicating object is set to zero when one surface of the triangle of the direction designation object faces upward (a face normal of the triangle is the vertical direction).

First, in some implementations, a point in the periphery of the section with the curvature radius r, which becomes an upper end of a range in the up-down direction of the route when the automobile is positioned at a point where the upper end of the range in the up-down direction of the route as viewed from the user becomes the lowest, is set as a section reference point CP for the curvature radius r. Further, for the curvature radius r of the section, a travel distance Th1 on a near side of the section reference point CP on the route and a travel distance Th2 on a far side of the section reference point CP on the route are set so as to increase as the curvature radius r of the section decreases.

Figure 3A:
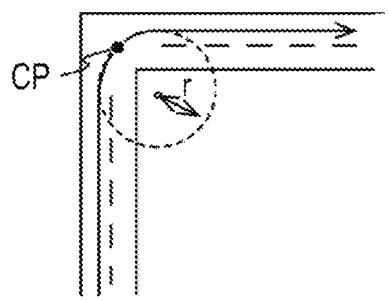
FIGS. 3A to 3J are views illustrating one implementation of a method of setting an arrangement height and an inclination of a direction indicating object according to the embodiment of the present invention.
Figure 3C:
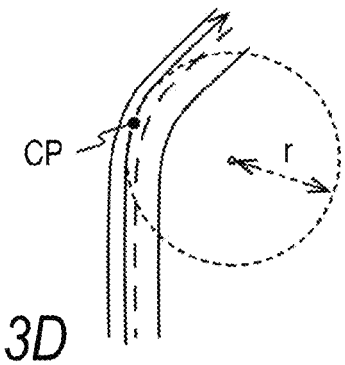
Figure 3B:
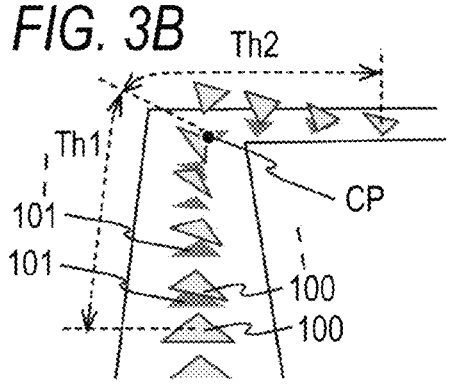
Figure 3D:
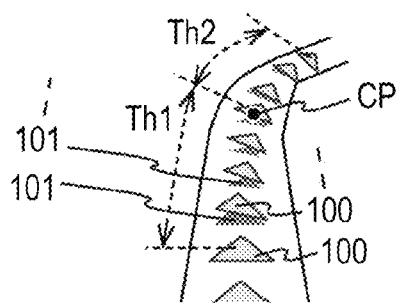

That is, the travel distance Th1 and the travel distance Th2 are set, as illustrated in FIG. 3B, for the curvature radius r illustrated in FIG. 3A. As illustrated in FIG. 3D, the travel distance Th1 and the travel distance Th2 are set so as to be shorter than the distances Th1 and Th2 illustrated in FIG. 3B for the curvature radius r illustrated in FIG. 3C, which is larger than the curvature radius r illustrated in FIG. 3A. Incidentally, the travel distance is set to be measured with the progressing direction of the route as positive.

Figure 3E:
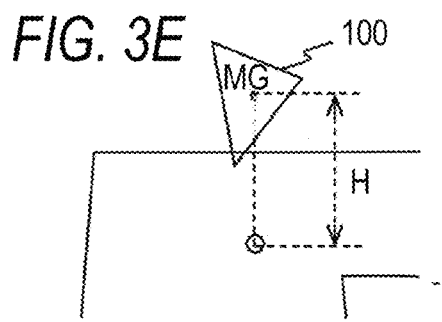
Figure 3F:
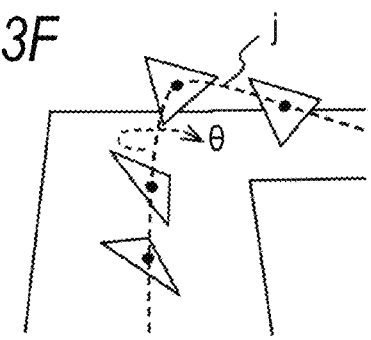

Then, a section between a point where a travel distance to the section reference point CP becomes Th1 and a point where a travel distance to the section reference point CP becomes Th2 is set as an upward arrangement section. Further, a relationship among a travel distance D of each point on the route within the upward arrangement section to the section reference point C, the arrangement height H of a center MG of the direction indicating object 100 from the road surface illustrated in FIG. 3E, and the inclination θ of the direction indicating object 100 illustrated in FIG. 3F is set in accordance with the curvature radius r such that the relationship becomes a relationship as illustrated in FIG. 3B for a plurality of points with respect to the curvature radius r illustrated in FIG. 3A and becomes a relationship as illustrated in FIG. 3D for a plurality of points with respect to the curvature radius r illustrated in FIG. 3C.

Figure 3G:
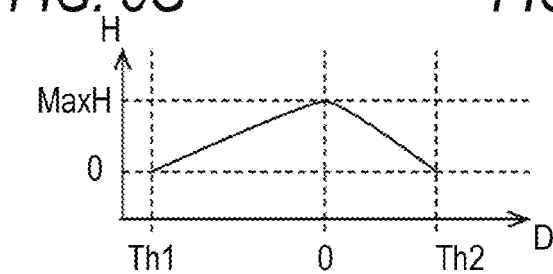
Figure 3I:
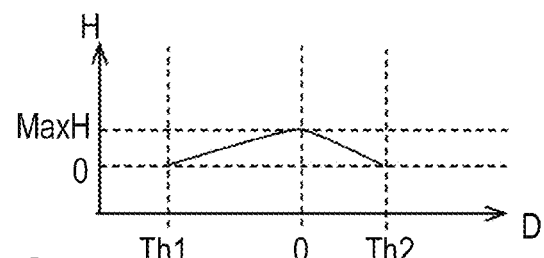

That is, as FIG. 3G illustrates the relationship between the travel distance D and the arrangement height H with respect to the curvature radius r illustrated in FIG. 3A, and FIG. 3I illustrates the relationship between the travel distance D and the arrangement height H with respect to the curvature radius r illustrated in FIG. 3C, the relationship is set such that the arrangement height H gradually increases from zero to a maximum arrangement height MaxH between the point having the travel distance Th1 to the section reference point CP and the section reference point CP, and the arrangement height H gradually decreases from the maximum arrangement height MaxH to zero between the section reference point CP and the point having the travel distance Th2 to the section reference point CP.

Further, the maximum arrangement height MaxH at the section reference point CP is set to increase as the curvature radius r decreases as illustrated in FIGS. 3G and 3I.

Figure 3H:
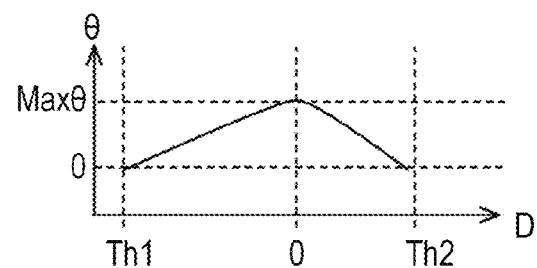
Figure 3J:
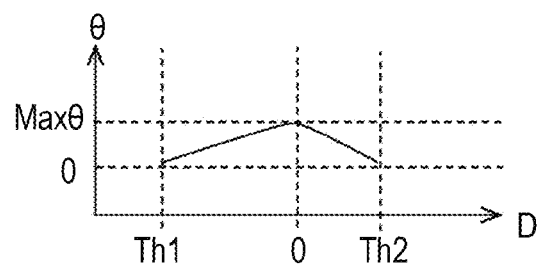

Further, as FIG. 3H illustrates the relationship between the travel distance D and the inclination θ with respect to the curvature radius r illustrated in FIG. 3A, and FIG. 3J illustrates the relationship between the travel distance D and the inclination θ with respect to the curvature radius r illustrated in FIG. 3C, the relationship is set such that the inclination θ gradually increases from zero to a maximum inclination Maxθ between the point having the travel distance Th1 to the section reference point CP and the section reference point CP, and the inclination θ gradually decreases from the maximum inclination Maxθ to zero between the section reference point CP and the point having the travel distance Th2 to the section reference point CP.

Further, the maximum inclination Maxθ at the section reference point CP is set to increase as the curvature radius r decreases as illustrated in FIGS. 3H and 3J.

When the section on the route where the progressing direction changes is a section where the progressing direction changes in the right direction as illustrated in FIGS. 3A and 3C, the inclination θ of the direction indicating object 100 becomes an angle obtained by measuring an axis J connecting positions of points, each of which is on the upper side, by the arrangement height H set for the travel distance D, of the each point on the road surface within the upward arrangement section, clockwise as viewed in the progressing direction of the route as illustrated in FIG. 3F. On the other hand, when the section on the route where the progressing direction changes is a section where the progressing direction changes in the left direction, the inclination θ of the direction indicating object 100 is an angle obtained by measuring the axis J counterclockwise as viewed in the progressing direction of the route.

Further, the relationship among the curvature radius r, the travel distance Th1, the travel distance Th2, the travel distance D, and the arrangement height H is set so as to satisfy a condition that a position where the direction indicating object 100 overlaps with a portion corresponding to at least a predetermined length or more of the above-described axis J as viewed from the user in the periphery of the section with the curvature radius r, is constantly included in the display area 201. As long as this condition is satisfied, the travel distance Th1 may be set such that a point on the near side by the travel distance Th1 from the section reference point CP becomes a point on the near side of the section on the route where the progressing direction changes, or becomes a point in the section on the route where the progressing direction changes. Similarly, the travel distance Th2 may be set such that a point on the far side by the travel distance Th2 from the section reference point CP becomes a point on the far side of the section on the route where the progressing direction changes, or becomes a point in the section on the route where the progressing direction changes. Further, the section reference point CP may be an arbitrary point as long as the condition is satisfied.

The relationship among the curvature radius of the section on the route where the progressing direction changes, the position on the route, and the arrangement height and the inclination of the direction indicating object 100, which are used at the time of displaying the direction mark, has been described as above.

Although FIGS. 3A to 3J illustrate the case where the section on the route where the progressing direction changes is the section where the progressing direction changes in the right direction, the relationship among the curvature radius of the section, the position on the route, the arrangement height of the direction indicating object 100, and the inclination of the direction indicating object 100 is set similarly as illustrated in FIGS. 4A to 4H even when the section on the route where the progressing direction changes is the section where the progressing direction changes in the left direction.

Figure 4A:
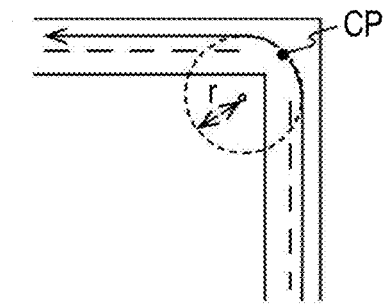
FIGS. 4A to 4H are views illustrating one implementation of the method of setting an arrangement height and an inclination of the direction indicating object.
Figure 4E:
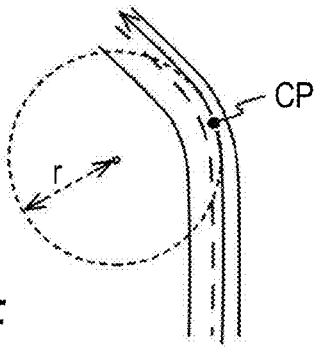
Figure 4B:
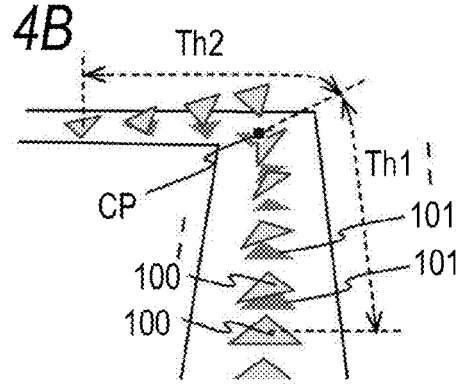
Figure 4F:
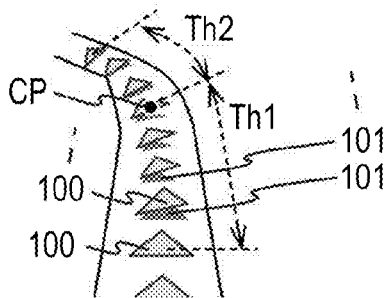
Figure 4C:
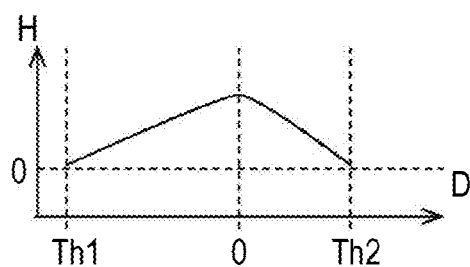
Figure 4G:
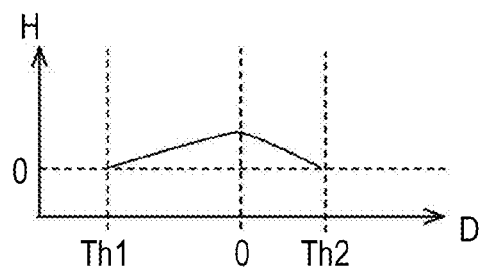
Figure 4D:
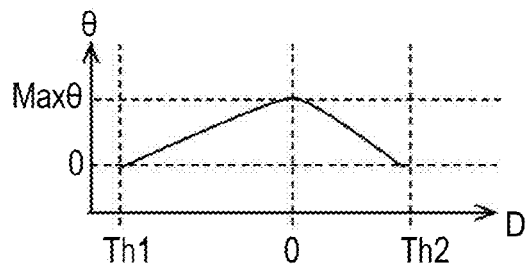
Figure 4H:
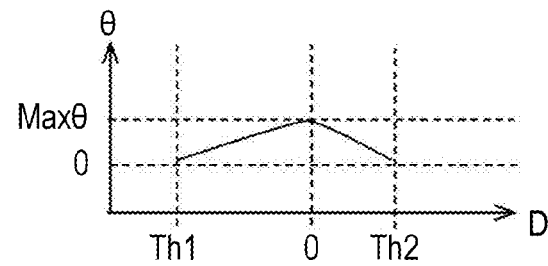

Incidentally, FIGS. 4B, 4C, and 4D illustrate examples of the arrangement height H and the inclination θ of the direction indicating object 100, the relationship between the travel distance D and the arrangement height H, and the relationship between the travel distance D and the inclination θ for a plurality of points within the upward arrangement section in a case where the curvature radius r is relatively small as illustrated in FIG. 4A. Further, FIGS. 4F, 4G, and 4H illustrate examples of the arrangement height H and the inclination θ of the direction indicating object 100, the relationship between the travel distance D and the arrangement height H, and the relationship between the travel distance D and the inclination θ for a plurality of points within the upward arrangement section in a case where the curvature radius r is relatively large as illustrated in FIG. 4E.

Meanwhile, when the section on the route where the progressing direction changes is the section where the progressing direction changes in the left direction, the inclination θ of the direction indicating object 100 is the angle obtained by measuring the above-described axis J counter-clockwise as viewed in the progressing direction of the route as described above.

Next, the progressing direction display process performed by the navigation system 2 will be described.

Figure 5:
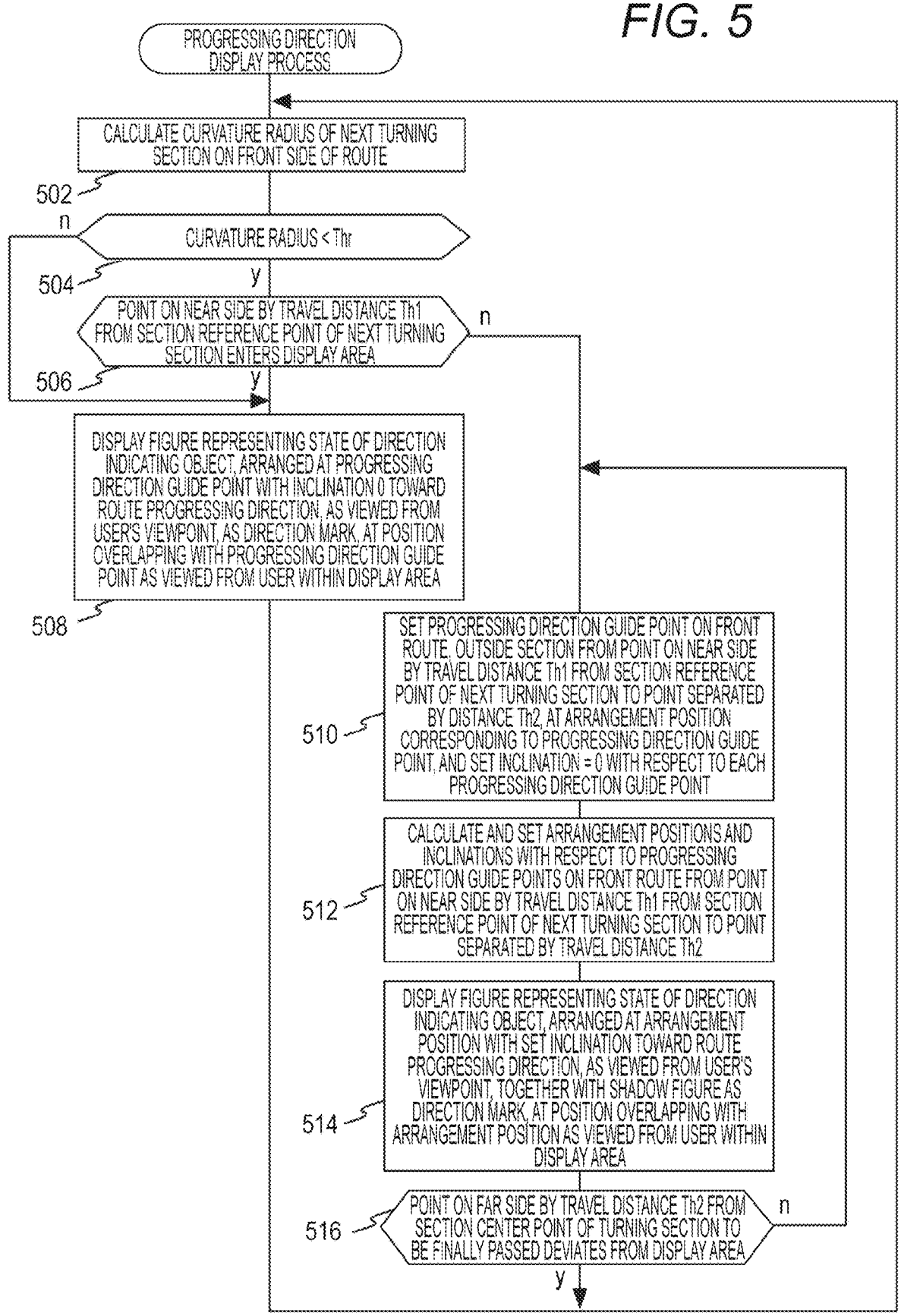
FIG. 5 is a flowchart illustrating one implementation of a progressing direction display process.

FIG. 5 illustrates a procedure of the progressing direction display process.

In the progressing direction display process, as illustrated in the drawing, the navigation system 2 first identifies a next turning section, which is a turning section which is to be passed next, on the set route based on the calculated current position and the map data, and calculates a curvature radius of the next turning section based on the map data (Step 502). Here, the turning section is a section on the route where the progressing direction changes.

Then, it is checked whether the calculated curvature radius is smaller than the above-described threshold Thr (Step 504). When the curvature radius is not smaller than the threshold Thr, points set at regular intervals on the road surface on the route are set as progressing direction guide points, and the heads-up display 1 is used to display a figure, which represents a state of the direction indicating object 100 arranged at a progressing direction guide point with the inclination θ with respect to a route progressing direction at the progressing direction guide point viewed from the user's viewpoint, at a position within the display area 201 overlapping with the progressing direction guide point as a display mark, for each of the progressing direction guide points overlapping with positions within the display area 201 as viewed from the user (Step 508), and the processing returns to Step 502.

On the other hand, when the curvature radius calculated in Step 502 is smaller than the threshold Thr (Step 504), it is checked whether a position overlapping with the point, on the near side by the travel distance Th1 from the section reference point CP of the next turning section, as viewed from the user has entered the display area 201 based on the calculated current position and the map data (Step 506). When the position has not entered, the processing proceeds to Step 508, the direction mark is displayed as described above using the heads-up display 1, and the processing returns to Step 502.

Incidentally, a point in the periphery of the next turning section, which becomes an upper end of a range in the up-down direction of a route when the automobile is positioned at a point where the upper end of the range in the up-down direction of the route as viewed from the user becomes the lowest is set as the section reference point CP for the next turning section.

On the other hand, when the position overlapping with the point, on the near side by the travel distance Th1 from the section reference point CP of the next turning section as viewed from the user, has entered the display area 201 (Step 506), a progressing direction guide point is directly set as an arrangement position with respect to the progressing direction guide point and an inclination=0 is set with respect to the progressing direction guide point, for each of the progressing direction guide points overlapping with positions within the display area 201 as viewed from the user among the progressing direction guidance points on the front route outside a section from the point on the near side by the travel distance Th1 from the section reference point CP of the next turning section to the point separated by the distance Th2 (Step 510).

Next, arrangement positions and inclinations with respect to the progressing direction guide points in the section from the point on the near side by the travel distance Th1 from the section reference point CP of the next turning section to the point separated by the travel distance Th2 are calculated and set (Step 512).

Here, a position on the upper side, by the arrangement height H set as described above with respect to the travel distance D from the progressing direction guide point to the section reference point CP, from the progressing direction guide point is set as the arrangement position with respect to each of the progressing direction guide points. Further, the inclination θ set as described above with respect to the travel distance D from the progressing direction guide point to the section reference point CP is set as the inclination with respect to the progressing direction guide point. However, the inclination θ is set as the angle obtained by measuring the axis J connecting the arrangement positions clockwise as viewed in the progressing direction of the route when the next turning section is the section where the progressing direction changes in the right direction, and is set as the angle obtained by measuring the axis J connecting the arrangement positions counterclockwise as viewed in the progressing direction of the route when the next turning section is the section where the progressing direction changes in the left direction Thus, for each of the progressing direction guidance points where the arrangement positions overlapping with the positions within the display area 201 as viewed from the user have been set in Steps 510 and 512, a figure representing a state of the direction indicating object 100, arranged at the arrangement position set with respect to the progressing direction guide point with the inclination set with respect to the progressing direction guide point toward the route progressing direction at the progressing direction guide point, viewed from the user's viewpoint is displayed, as the display mark, at the position within the display area 201 overlapping with the arrangement point, and a shadow figure is displayed (Step 514).

Figure 6:
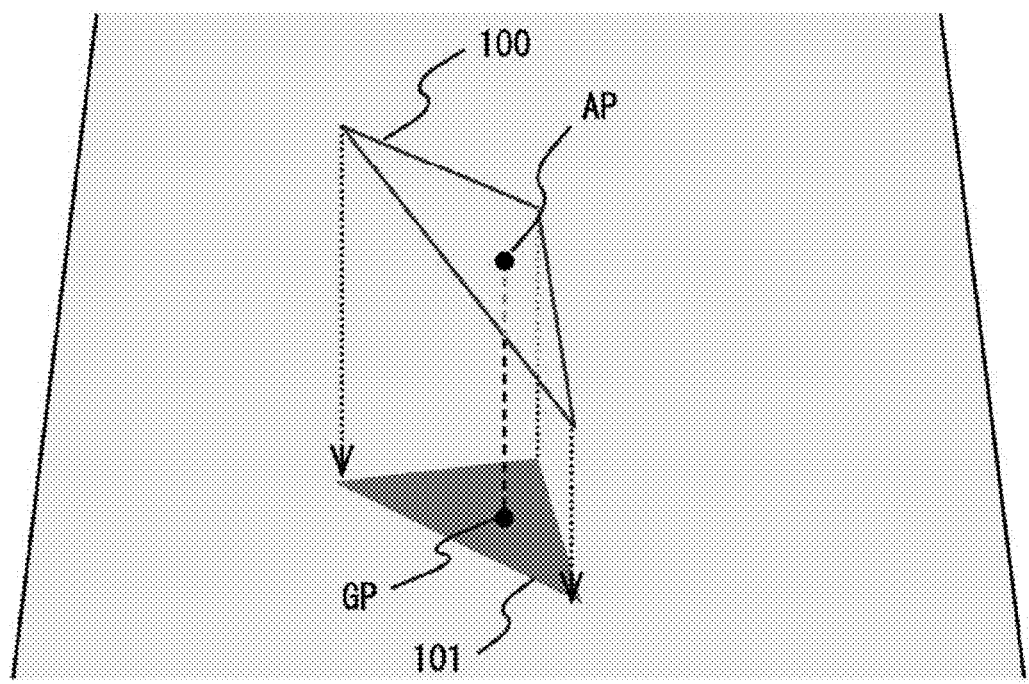
FIG. 6 is a view illustrating one implementation of a method of setting a shadow figure.

Here, the shadow figure is a figure representing a shadow on the road surface of the direction indicating object 100. As illustrated in FIG. 6, a figure representing a state of a shadow object 101, which is an object having a shape obtained by vertically projecting the direction indicating object 100 arranged at a set arrangement position AP with a set inclination onto a road surface on the lower side, as viewed from the user's viewpoint is displayed, as the shadow figure, at a position within the display area 201 overlapping with the progressing direction guide point. However, a part of the shadow figure that overlaps with the direction mark is not displayed.

Therefore, for example, when the direction indicating object 100 is arranged as illustrated in FIGS. 3B, 3D, 4B, and 4F, the shadow object 101 for each of the direction indicating objects 100 is set as illustrated in each drawing.

Returning to FIG. 5, when the direction mark and the shadow figure are displayed (Step 514), it is checked whether the point on the far side by the travel distance Th2 from the section reference point CP of the next turning section deviates from the inside of the display area 201 to the outside of the display area 201 as viewed from the user (Step 516). The processing returns to Step 510 if the point does not deviate, and returns to Step 502 if the point deviates.

Implementations of the progressing direction display process performed by the navigation system 2 has been described as above.

Figure 2C:
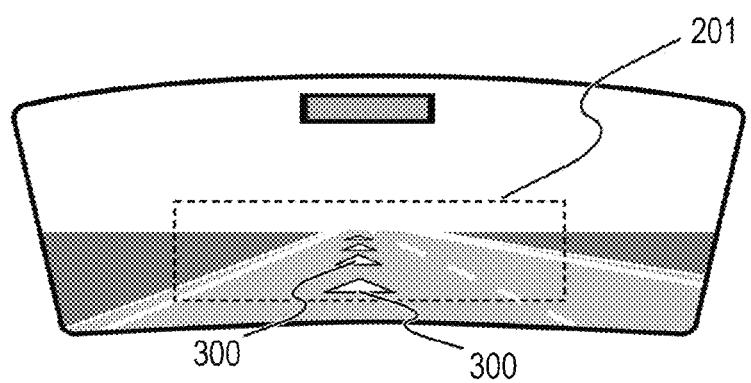
Figure 7A:
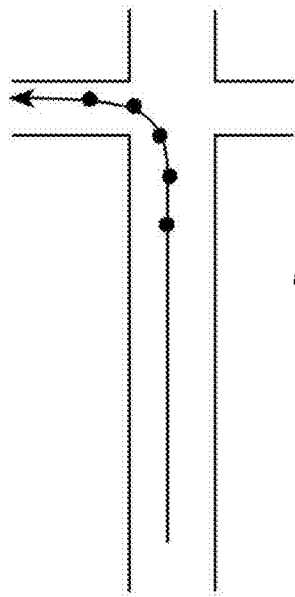
FIGS. 7A to 7F are views illustrating a display example of the heads-up display.
Figure 7B:
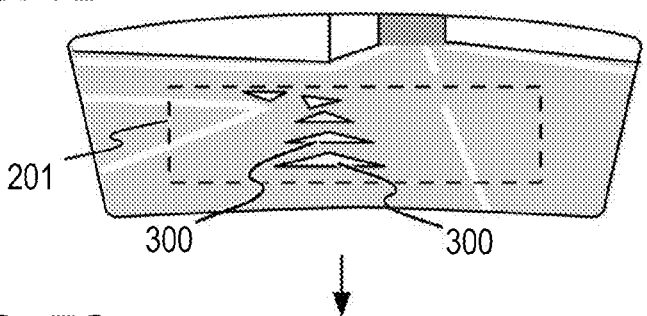
Figure 7C:
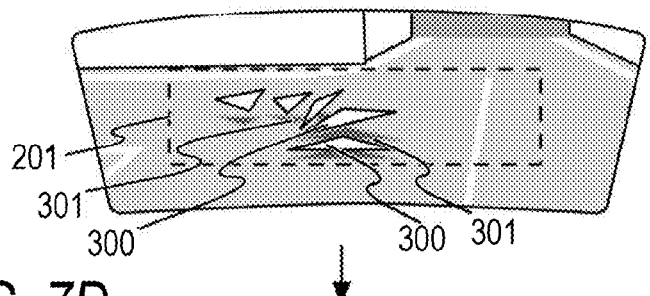
Figure 7D:
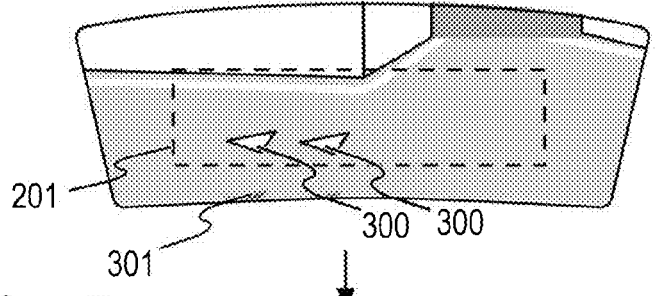
Figure 7E:
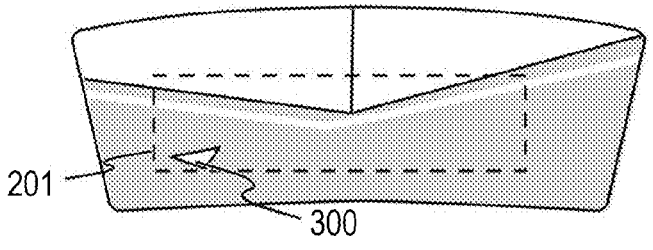

In some implementations of the above-described progressing direction display process, when a route for turning left at an intersection has been set as illustrated in FIG. 7A, a plurality of direction marks 300 each presenting the progressing direction at each point on the road surface on the route are displayed so as to be viewable as if the direction mark exists at the point on the road surface representing the progressing direction on the real space as illustrated in FIG. 2C until the automobile approaches the intersection.

On the other hand, until the automobile passes the intersection after approaching the intersection, the plurality of direction marks 300 each representing the progressing direction at each point on the road surface on the route are displayed so as to be viewable as if the direction marks 300 exist above the point representing the progressing direction on the real space at each timing by the heads-up display 1 as illustrated in FIGS. 7B, 7C, 7D, and 7E. Further, a shadow FIG. 301 is displayed together with the direction mark 300 so as to be viewable as a shadow, which exists at the point representing the progressing direction, of the direction mark 300.

Figure 7F:
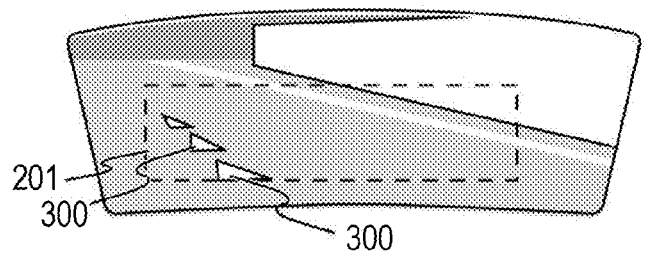

Then, after passing the intersection, the display of the direction mark 300 returns to the display in the mode of being viewable as if the direction mark 300 exists at the point on the road surface representing the progressing direction on the real space as illustrated in FIG. 7F.

Here, the position on the real space that is viewable as if the direction mark 300 representing the progressing direction of each point exists does not change at each time point. Therefore, there is no discontinuity in display of the direction mark 300 representing the progressing direction of the same point.

Further, a height of the position on the real space that is viewable as if the direction mark 300 representing the progressing direction of each point exists until the automobile passes the intersection after approaching the intersection gradually increases from a height of the road surface and then gradually decreases to the height of the road surface along the progressing direction of the route. Thus, the positions viewed as if the respective direction marks 300 exist have continuity, and the discontinuity does not occur in the route represented by the row of direction marks 300.

Thus, the display of the direction mark 300 having discontinuity does not occur according to the present embodiment.

Since the shadow FIG. 301 is displayed for each of the direction marks 300 so as to be viewable as if the direction mark 300 exists at the point on the road surface representing the progressing direction in the present embodiment, the user can more easily grasp the point on the road surface where the arrow represents the progressing direction using the shadow FIG. 301.

Since the inclination of the direction indicating object 100 is set to be larger as the arrangement position is higher, it does not happen that an angle in the line-of-sight direction of the direction indicating object 100 arranged above with respect to the triangular plane becomes an excessively acute angle so that the progressing direction does not hardly viewable from the direction mark 300. Further, it is possible to present the change in the progressing direction by the row of direction marks 300 representing the direction indicating object 100 whose height gradually changes with a natural expression without discomfort using the row of direction marks 300 representing the direction indicating object 100 whose inclination gradually changes.

Further, the position of the direction mark 300, which represents the progressing direction of the point until the automobile passes the intersection after approaching the intersection, within the display area 201 becomes a position on the upper side than that in the case of displaying the direction mark 300 at the position overlapping with the point on the road surface as illustrated in the drawings.

Accordingly, it is possible to display the direction mark 300 to guide the progressing direction of the point even when a position overlapping with the intersection or a point in the periphery of the intersection as viewed from the user is set on the lower side of the display area 201 at the intersection and the point on the near side thereof.

Incidentally, the case where the section on the route where the progressing direction changes is the intersection has been described in FIGS. 7A to 7F. Similarly, even in a case where the section where the progressing direction changes is a curve or the like, it is possible to display the direction mark 300 to guide the progressing direction of the point even when the position overlapping with the section or the point in the periphery of the section as viewed from the user is set on the lower side of the display area 201 without occurrence of discontinuous display of the direction mark.

Figure 8A:
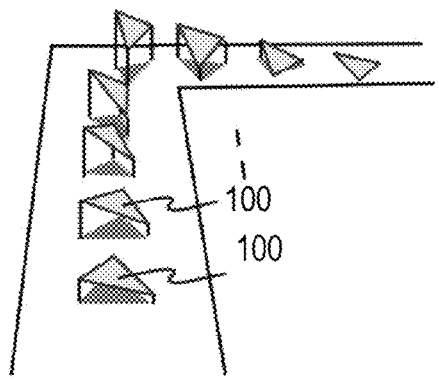
FIGS. 8A and 8B are views illustrating another example of a direction mark.
Figure 8B:
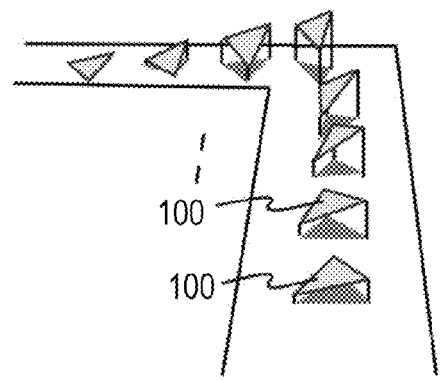

Meanwhile, an object having a shape of a pillar with the triangular direction indicating object 100 illustrated above as a top face and the shadow object 101 as a base may be used as the direction indicating object 100 used in the above embodiment as illustrated in FIGS. 8A and 8B. In this manner, the user can more easily grasp the point on the route where the direction mark represents the progressing direction. In this case, the shadow figure is not displayed.

Further, the travel distance Th1, the travel distance Th2, and the inclination θ are changed in accordance with the curvature radius r of the section on the route where the progressing direction changes in the above embodiment, but some or all of these may be fixedly set irrespective of the curvature radius r.

Further, the heads-up display 1 capable of moving a display position of a virtual image in the front-rear direction of the automobile may be used as the heads-up display 1 according to implementations described above. In this case, it is preferable to set the position of the virtual image of each direction mark in the front-rear direction of the automobile to a position close to the arrangement position of the direction indicating object 100 represented by the direction mark as much as possible.

It is intended that the foregoing detailed description be regarded as illustrative rather than limiting, and that it be understood that it is the following claims, including all equivalents, that are intended to define the spirit and scope of this disclosure.

What is claimed is:

1. An in-vehicle system comprising:
    a heads-up display configured to display an image using a virtual image on a front side of a front windshield of an automobile with respect to a user aboard the automobile; and
    a processor configured to execute instructions stored in a memory and to:
        set a route to a destination; and
        display, using the heads-up display, a direction mark representing a progressing direction along the route at each guide point of a guide point set as viewed from the user, where each guide point of the guide point set is positioned at predetermined distance intervals on a road surface on the route in front of the automobile,
    wherein, for a curve section along the route where the progressing direction on the route changes in a left direction or a right direction by at least a predetermined amount, the processor is configured to:
        set an upward display section, which is a section from a first point within the curve section to a second point within the curve section, where the first point is, in the progressing direction, a point along the route positioned before a section reference point of a curvature radius of the curve section and the second point is, in the progressing direction, a point along the route positioned after the section reference point of the curvature radius of the curve section, and
        display, using the heads-up display, the direction mark for each of the guide points of the guide point set included in the upward display section at an arrangement height set for the direction mark at that guide point as viewed from the user using the heads-up display,
    wherein the arrangement height set for the direction mark at the guide point is set depending on a relative position of the guide point with respect to the upward display section,
    wherein the relative position and the arrangement height have a relationship that the arrangement height gradually increases from zero to a predetermined maximum height and then gradually decreases from the maximum height to zero as the relative position changes from a start point to an end point of the upward display section, and
    wherein at least one of the direction marks within the upward display section comprises a figure part representing a direction and a pillar figure part connecting the figure part representing the direction, in a vertical direction along the arrangement height, with the guide point associated with the direction mark as viewed from the user.

2. The in-vehicle system according to claim 1, wherein the processor is configured to set the maximum height to increase as a curvature radius decreases in accordance with the curvature radius of a section where the progressing direction changes in the left direction or the right direction by at least the predetermined amount for which the upward display section has been set.

* * * * *